Oct. 13, 1964    U. HOFMANN    3,152,578
MULTICOLOR BALL-POINT WRITER

Filed July 27, 1961    5 Sheets—Sheet 1

Inventor:
ULRICH HOFMANN
BY
ATTORNEY.

Oct. 13, 1964 U. HOFMANN 3,152,578
MULTICOLOR BALL-POINT WRITER
Filed July 27, 1961 5 Sheets-Sheet 2
Fig. 3
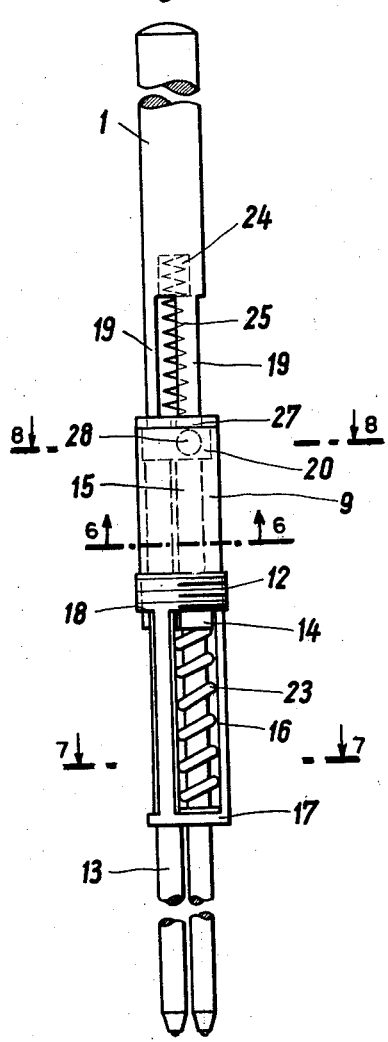
Fig. 3a
Fig. 4
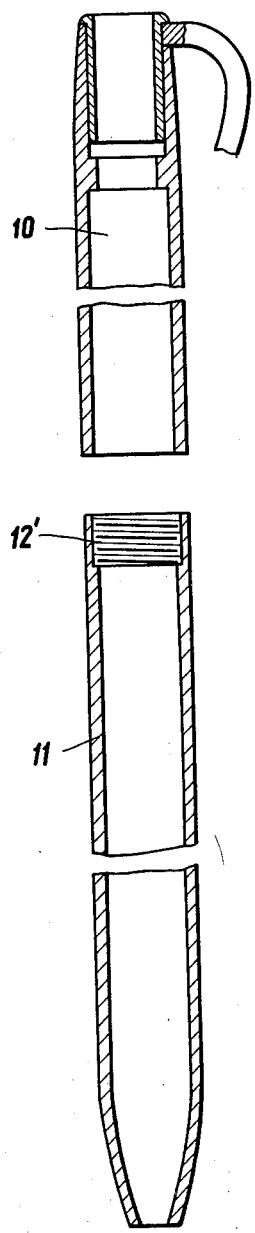
Fig. 5
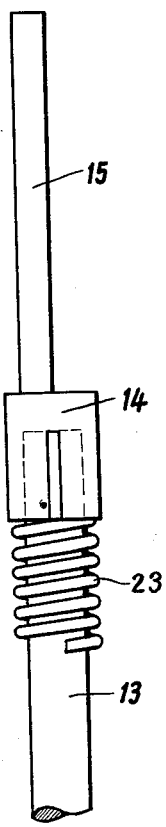
Inventor:
ULRICH HOFMANN
BY
ATTORNEY.

Oct. 13, 1964

U. HOFMANN 3,152,578

MULTICOLOR BALL-POINT WRITER

Filed July 27, 1961

Inventor:
ULRICH HOFMANN
BY
ATTORNEY.

Oct. 13, 1964 U. HOFMANN 3,152,578
MULTICOLOR BALL-POINT WRITER
Filed July 27, 1961 5 Sheets-Sheet 4

Inventor:
ULRICH HOFMANN
BY
ATTORNEY.

Oct. 13, 1964   U. HOFMANN   3,152,578
MULTICOLOR BALL-POINT WRITER
Filed July 27, 1961   5 Sheets-Sheet 5
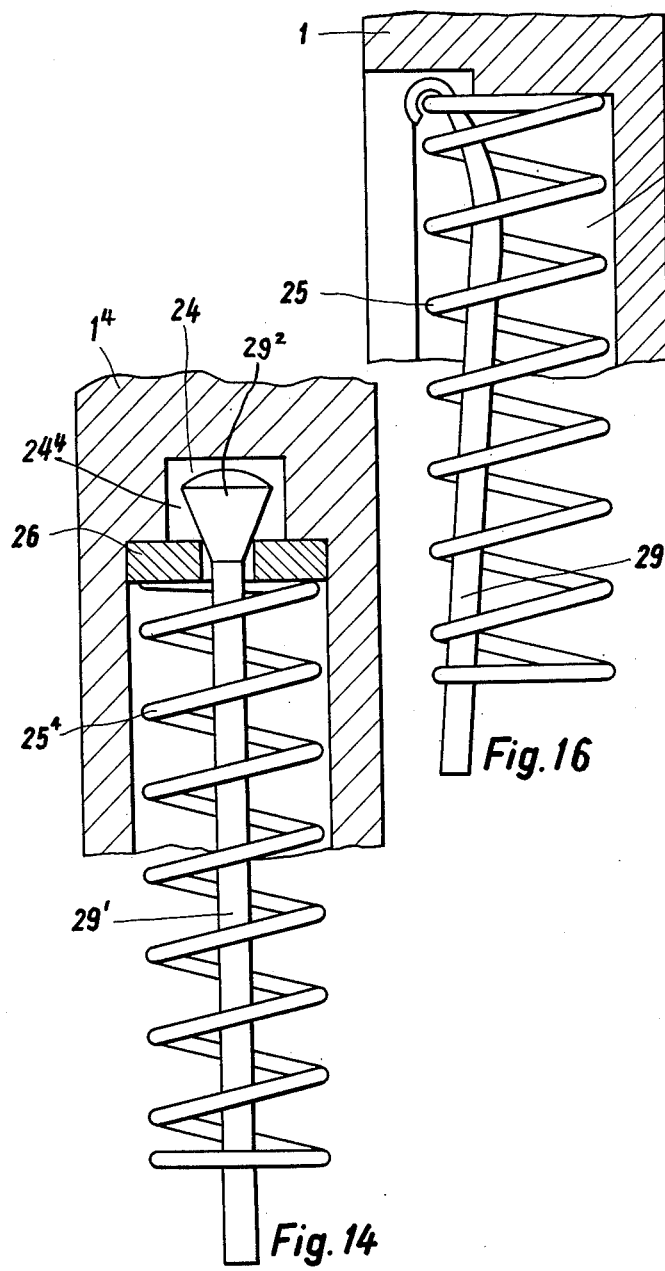
Fig. 14
Fig. 16
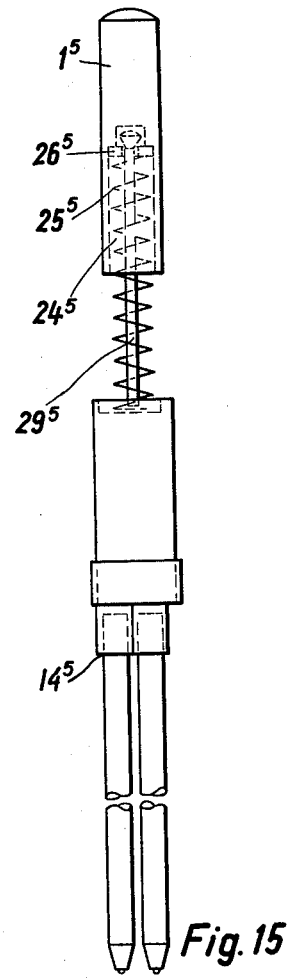
Fig. 15
*Inventor:*
ULRICH HOFMANN
BY
ATTORNEY.

United States Patent Office 3,152,578
Patented Oct. 13, 1964

3,152,578
MULTICOLOR BALL-POINT WRITER
Ulrich Hofmann, Goethestrasse 99, Ebingen,
Wurttemberg, Germany
Filed July 27, 1961, Ser. No. 127,165
1 Claim. (Cl. 120—14.5)

The present invention relates to a multicolor ball-point writer.

It is one object of the present invention to provide a multicolor ball-point writer, wherein the lead, released by its own gravity, is not brought into its operative writing position, as it has been done before, through the upper housing portion, rather by means of a push-button known in connection with one-color ball-point writers and disposed at the upper end of the writing device. If, however, a push-button arrangement of the known single-color structure were used, the required unusually long push-button would lead to a writing device of proportions which cannot be accepted.

It is another object of the present invention to provide a multicolor ball-point writer, wherein the known method of retaining the lead-holding means in slots is abandoned, rather disposing the lead-holding means in a cage, which is rigidly secured to the upper portion of the writing device and which is merely set on or secured by thread means to the lower portion of the housing. By this arrangement, no advancing movement is required during the exchange of a lead, rather by sliding off or threading off the lower portion of the housing, all leads are accessible and can be removed and exchanged. The present structure does not require any additional movement of the push-button during a lead change, which push-button permits selectively to move the different-colored leads into writing position. In this case the mechanical structure known in connection with one-color ball-point writers is used.

By means of a slight inclination of the writing device, the direction of which can be set on the housing by color markers (not shown), the insertion of the respective color leads into the mechanical device of the push-button can be brought about. If the push-button is pressed down, the latter assumes a closed system of mechanical forces with the lead determined by the particular inclined position of the writing device. Since the push-button is retained in the writing position by known mechanical means, the pressure exerted during writing, which is transferred over the lead and the lead-holding means directly to a movable body, brings about the closed system of mechanical forces.

If the chosen lead is to be transferred into its withdrawn position, then a new operation of the push-button is required, the same as is known in connection with one-color writing devices. If, however, a lead disposed already in writing position is to be replaced by a lead of a different color, the writing device must be brought into a position characterized by color markers (not shown) and the push-button must be pressed twice. During the first pressure period, the previously operating lead is brought into its withdrawn position. During this withdrawal of the previously operating lead the movable intermediate body changes its position, so that upon the second pressure of the push-button the new lead is moved into writing position. The path of the push-button amounts here only to about one half of the path which must be provided for slides of conventional multicolor writing devices. By this arrangement a rather favorable proportion of the design of the writing device is achieved.

The present structure permits the design of the writing devices in a handy smooth housing, which is not interrupted by slots and slides and also not by a movable cap, and which can be gripped an clasped at any time over its entire length. The springs for the return movement of the leads are formed as tension springs, disposed around the lead-holding means, whereby space is gained inside of the device and a simple mounting of the mechanical means is made possible. By this simple structure it is also possible to spray all parts, except the springs, out of artificial material, which reduces appreciably the manufacturing costs and furthermore assures a pleasant appearance and a low weight of the device.

With these and other objects in view, which will become apparent in the following detailed description, the present invention will be clearly understood in connection with the accompanying drawings, disclosing by example a three-color ball-point writer, in which:

FIG. 3 is an elevation of the inner structure of the multicolor ball-point writer;

FIG. 3a is a bottom plan view of FIG. 3;

FIG. 4 is an axial section of the housing which receives the inner structure shown in FIG. 3;

FIG. 5 is a fragmentary elevation of the lead-holding means;

FIG. 10b is a section along the lines 10b—10b of FIG. 10a;

FIG. 12b is a top plan view of the cage shown in FIG. 12a;

FIG. 13b is a top plan view of the spring shown in FIG. 13a;

FIG. 14 is an axial section of another embodiment of the pin suspension in the push-button;

FIG. 15 is an elevation of another embodiment of the inner structure of the ball-point writer; and FIG. 16 is an axial section of another embodiment of suspension of the pin in the push-button.

Figure 1:
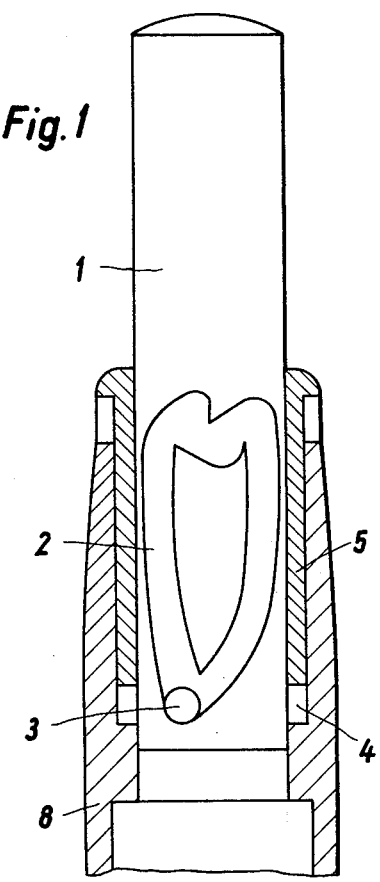
FIGURE 1 is an axial section of the push-button arrangement of the multicolor ball-point writer.
Figure 2:
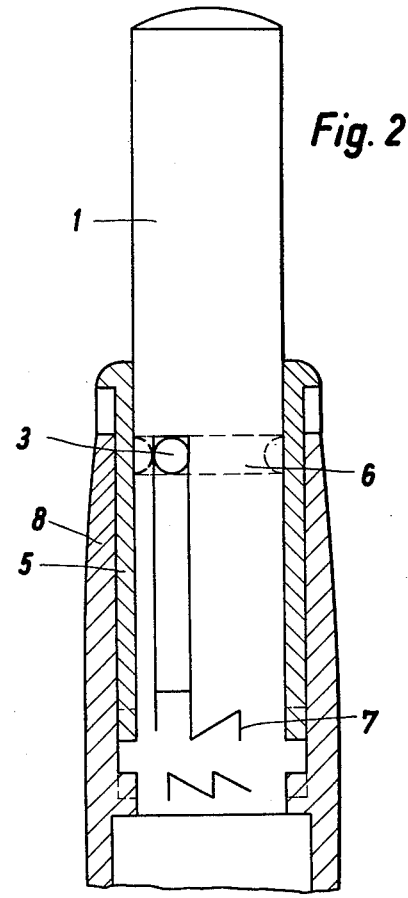
FIG. 2 is an axial section of another embodiment of the push-button arrangement of the multicolor ball-point writer.

Referring now to the drawings and in particular to FIGS. 1 and 2, the present structure makes use of the mechanical means known in connection with one-color writing devices as shown in FIGS. 1 and 2. In these known devices, upon operation of a push-button, the transformation from the writing position into the non-writing position and vice versa is brought about. Thus, the structure comprises a push-button 1, which is equipped with a curved groove 2 and a ball 3 is adapted to move partly in the curved groove 2 and partly in an annular groove 4 provided in the closing bushing 5 disposed in the sleeve 8.

In the embodiment shown in FIG. 2 an annular groove 6 is provided on the push-button 1, while the curved groove consists of two parts, namely one part consisting of the curved groove 7 provided in the closing bushing 5 and a second part consisting of a counter piece provided on the sleeve 8, which counter piece is not shown.

Each of the embodiments of FIGS. 3 to 16 includes the structure of FIG. 1 or FIG. 2, which structure performs the function of retaining the selected writing instrument in the projected position.

FIG. 3 is an elevation of the inner part of the ball-point writer removed from its housing, shown in FIG. 4.

FIG. 3 shows the essential parts of the inner structure of the ball-point writer, namely the pushbutton 1, which projects into the cage 9, the basket 16 and the leads 13. The selection of the lead of desired color takes place in the chamber 20 provided in the upper portion of the cage 9, which chamber 20 is closed up at its top by a plate 27 which is engaged by the spring 25 disposed in an axial recess provided in the push-button 1 and serving the purpose to retain the push-button 1 in its uppermost position.

The cage 9 serves substantially for the reception of the lead holding means. Furthermore, the cage 9 is secured to the housing, which consists of two parts. The upper part 10 of the housing can be rigidly secured to the cage 9, while the lower part 11 of the housing, which is equipped at its upper end with an inner thread 12' complementary to the thread 12 provided at the lower end of the cage 9, can be taken off or screwed off for changing the leads 13. The latter are accessible upon removal of the lower part 11 of the housing and can be withdrawn from the lead-holders. This arrangement brings about the advantage that the individual parts can be mounted easily while being outside of the housing, as shown in FIG. 4.

Referring now to FIG. 5 of the drawings, which discloses the means for retaining the leads 13, it can easily be ascertained that below the guide member 15 of the lead holder 14 a chamber is provided to receive the leads 13. The latter are secured in position by the resiliency of an elastic material in a slotted arrangement.

The cage 9 has three channels disposed concentrically around the median axis thereof, in which channels the guide members 15 of the individual lead holders 14 move. The guide members 15 can be formed as pins, as hollow cylinders or half cylinders or, also, be formed as prisms.

Figure 6:
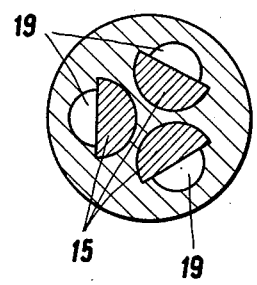
FIG. 6 is a section along the lines 6—6 of FIG. 3.
Figure 7:
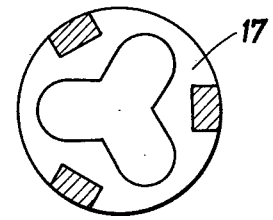
FIG. 7 is a section along the lines 7—7 of FIG. 3.

Referring now to FIG. 6, which discloses a cross-section through the cage 9, the guide members 15 of the lead holders 14 are shown as half cylinders. Tension springs 23 are disposed below the cage 9 in a basket 16 shown in cross-section in FIG. 7 of the drawings and extending downwardly from the cage 9. The tension springs 23 engage at one end the bottom plate 17 of the basket 16 and at their other end the lead holder 14, thereby urging the leads 13 and the lead holders 14, respectively, towards the bottom face 18 of the cage 9.

The push-button 1 has at its lower end projections 19 of prism shape. The projections 19 extend through the upper plate 27 of the chamber 20 and are formed in such manner that they fit into the free side of the channels in the cage 9, which at one side already receive the guide members 15 of the lead holders 14. This structure can be ascertained from FIG. 3, where the projections 19 of the push-button 1 are disposed opposite and adjacent to the guide members 15 of the lead holders 14. Upon pressing downwardly the push-button 1, the projections 19 move in the channels in the cage 9 and pass by the guide members 15 of the lead holders 14 without moving the latter. In the chamber 20, disposed above the guide members 15 in the upper portion of the cage 9 (FIGS. 3 and 8), a ball 28 is freely movable. Upon a slight inclination of the writing device, the ball 28 rolls in accordance with the formation of the side walls along the inner faces of the chamber 20 to a predetermined point 21 of the chamber 20. The corresponding guide member 15 of the lead holder 14 of a predetermined lead is disposed just below one of the three positions 21, indicated in FIG. 8. If now, in the particular position of the ball 28, the push-button 1 is pressed down, the latter abuts by means of its corresponding projection 19 the ball 28 and the latter engages the lead holder 14 corresponding with the selected position of the ball 28 in downward direction, so that the corresponding color lead is brought into the writing position and is retained in such position by the means disclosed in FIGS. 1 and 2 of the drawings.

It is of advantage to equip the half cylindrical guide members 15 of the lead holders 14 with a groove 22 and the projections 19 of the pushbutton 1 with a complementary key 22', the groove 22 and the key 22' being disposed on their respective engaging axially extending faces, in order to assure safely that the projection 19 upon pressing down the push-button 1 passes by the guide member 15, if the ball does not connect the moving elements.

Figure 10A:
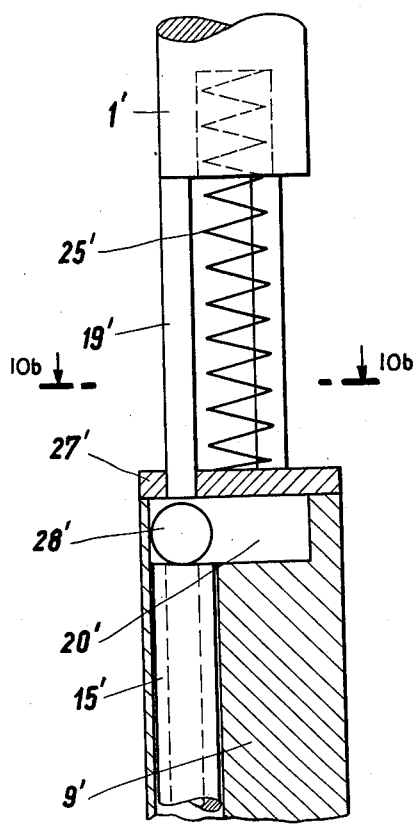
FIG. 10a is a fragmentary axial section of another embodiment of the push-button connection with the guide member.
Figure 10B:
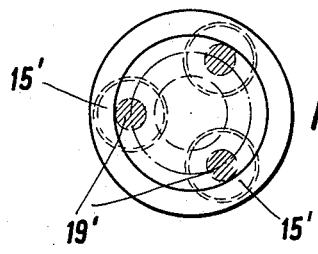
Figure 9:
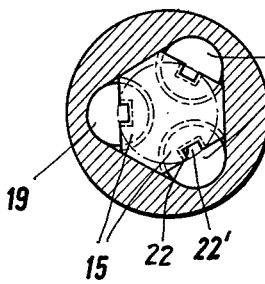
FIG. 9 is a section similar to that shown in FIG. 8.

Referring now again to the drawings, and in particular to FIGS. 10a and 10b, another embodiment of the design of the projections 19' of the pushbutton 1' and of the guide members 15' of the lead holders, is disclosed. The projections 19' are formed as cylindrical rods, which fit into the guide members 15' formed as hollow cylinders. Upon exerting pressure on the ball 28', which sits on the upper opening of the hollow cylinder of the corresponding guide member 15', in the chamber 20' a safe pressure connection is brought about. It is suitable and necessary, to arrange the projections 19' of the push-button 1' in the cage 9' in such manner that so much free space remains in the center of the chamber 20', that the ball 28', situated over one of the guide members 15', cannot be clamped to an unfavorable position of the writing device during the pressing down of the push-button 1'. FIG. 10b shows also clearly that the ball 28' has a sufficient space in the center of the chamber 20', if all three projections 19' are inserted into the corresponding hollow cylindrical guide members 15. The structure shown in FIG. 10a indicates again the arrangement of a return spring 25' for the push-button 1' as well as the top plate 27' for the cage 9'.

Figure 11:
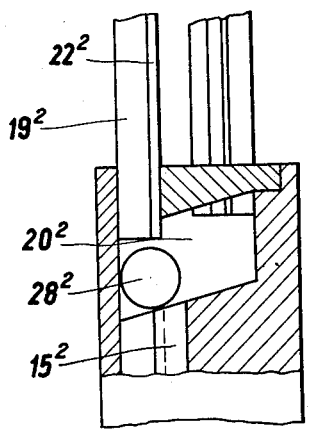
FIG. 11 is a fragmentary section of another embodiment of the upper section of the cage.
Figure 8:
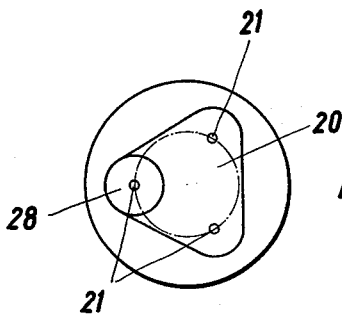
FIG. 8 is a section along the lines 8—8 of FIG. 3.

Referring now again to the drawing, and in particular to FIG. 11, it is shown that the bottom face of the chamber $20^2$ may be arranged inclined relative to the longitudinal axis of the writing device, so that in the vertical position of the writing device, the ball $28^2$ is disposed always above a predetermined lead holder. This structure permits an arrangement according to which a predetermined color, for instance blue, always automatically at a substantially vertical position of the writing device is easily rendered operative, without looking at the color markers (not shown), so that the writing device must be brought into the particular inclined position marked for the other colors only if the writing with such other color leads is desirable. The guide members $15^2$ are identical with the elements in the previously described embodiment, indicating also the projection $19^2$, the key $22^2$ and the corresponding groove.

Figure 12A:
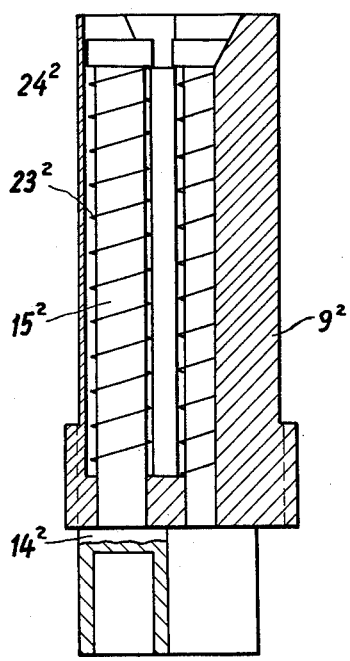
FIG. 12a is an axial section of another embodiment of the cage.
Figure 13A:
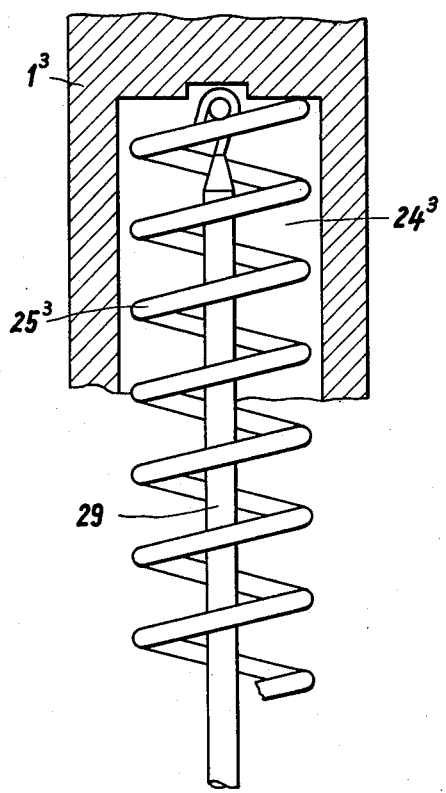
FIG. 13a is a fragmentary axial section of another embodiment of the push-button.
Figure 12B:
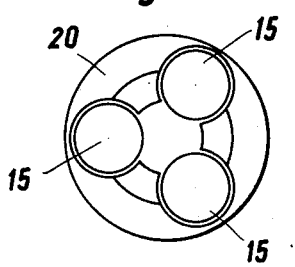
Figure 13B:
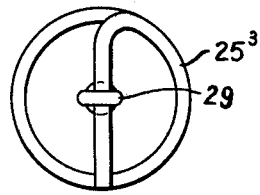

Referring now again to the drawings, and in particular to FIGS. 12a and 12b, which figures disclose still another embodiment of the cage 9, the latter is formed in such manner that the springs $23^2$, which are disposed in the embodiment shown in FIG. 3 below the lead holder 14 in the basket 16, surround in this embodiment the guide members $15^2$ of the lead holders $14^2$. The springs 23 provided in the embodiment shown in FIG. 3 are thereby eliminated. Furthermore, in accordance with the arrangement of FIGS. 13a and 13b no projections 19 are required on the push-button 1. Rather in this embodiment the chamber $24^3$, provided for the springs $25^3$ in the push-button $1^3$, which spring $25^3$ is adapted to cause the return of the push-button $1^3$, is formed in such manner that, as shown in FIGS. 13a and 13b, a pin 29, suspended at the upper end of the spring $25^3$, can be subjected to a pendulum movement.

Referring now to FIG. 14 of the drawing, still another embodiment is disclosed, in which the pin 29' extends through an opening provided in an annular disk 26 and is supported by the latter and the disc 26 can be maintained in the uppermost position in the push-button $1^4$ by means of the spring $25^4$ of the pushbutton $1^4$, and the pin 29' is equipped at its upper end with a head $29^2$, the largest diameter of which is greater than the opening in the annular disc 26 so that the head $29^2$ of the pin $29^1$ is retained in the chamber 24⁴ of the pushbutton 1⁴. Upon setting the writing device slightly into an inclined position, the lower end of the pin 29' will assume a position just above one of the guide members 15, and upon pressing down the push-button 1⁴, an engagement of the pin 29' with the corresponding chosen guide member 15 may be brought about, which engagement will be maintained as long as the corresponding lead is in its writing position.

In order to provide such arrangement of a writing device, that in the situation shown in FIG. 11 upon substantially vertical position of the writing device, always the same colored lead will be operated without observing the color markers (not shown), the pin 29 is suspended eccentrically, as shown in FIG. 16. Furthermore, the pin 29 can be chosen as to its weight in such manner that at a substantially vertical position of the writing device, the pin 29 assumes an inclined position, so that the lower end of the pin 29 engages the chosen guide member 15 and automatically pushes the corresponding color lead into writing position, upon pressing down the push-button 1.

Referring now to FIG. 15, it will be observed that in accordance with still another embodiment of the present invention, a single spring 25⁵ is provided, which serves not only the return of the push-button 1⁵, but simultaneously also operates the lead holders 14⁵. The pin 29⁵ is again suspended from the annular disk 26⁵ and the spring 25⁵ extends beyond the chamber 24⁵.

While I have disclosed several embodiments of the present invention, it is to be understood that these embodiments are given by example only and not in a limiting sense, the scope of the present invention being determined by the objects of the claim.

I claim:

A multiple cartridge retractable pen mechanism comprising a longitudinal housing open at its front end and at its rear end, a pushbutton inserted in and projecting from the rear end of said housing and axially movable in said housing means for holding said push-button in its forward operative position, a cage in said housing adjacent the inner end of said push-button and receiving the latter upon pressing said push-button into said housing, a basket disposed in said housing in front of said cage and connected with the latter, a plurality of holders mounted in said basket and disposed at the end of and axially movable in said housing and each of said lead holders retaining releasably a lead of predetermined color to project the latter from the front end of said housing in its operative position, a plurality of guide members equal in number with that of said lead holders and each of said guide members operatively connected with the corresponding of said lead holders, an intermediate member disposed at least at the inner end of said push-button and assuming by gravity a selected one of a plurality of positions in response to a predetermined inclined position of said housing, said intermediate member providing selectively a closed system of mechanical forces between said push-button and any one of said guide members, thereby moving said selected lead into writing position upon pressing inwardly said push-button, and a spring disposed in said push-button and engaging the latter into its rearmost position, means disposed in said push-button for locking said selected lead in writing position, said intermediate member comprising a pin-shaped body disposed between said push-button and said guide members, and said pin-shaped body being freely suspended within said spring of said push-button to assume an inclined position toward one of said guide members and positioning itself in the respective inclined positions of said writer into operative position relative to the other of said guide members corresponding to the selected lead, said pin-shaped body being suspended eccentrically on said spring of said push-button and being of such shape that due to said eccentric suspension and due to said shape, said pin-shaped body adjusts itself relative to a predetermined lead in the substantially vertical position of said writer.

References Cited in the file of this patent

UNITED STATES PATENTS

| 2,163,515 | Fend | June 20, 1939 |
| 2,837,057 | Morlock et al. | June 3, 1958 |
| 3,025,833 | Fend | Mar. 20, 1962 |

FOREIGN PATENTS

| 922,075 | France | Jan. 27, 1947 |
| 980,908 | France | Jan. 10, 1951 |
| 985,667 | France | Mar. 14, 1951 |
| 1,000,555 | France | Oct. 17, 1951 |
| 1,023,101 | France | Dec. 24, 1952 |